No. 863,470. PATENTED AUG. 13, 1907.
F. D. THOMAS.
ILLUSION APPARATUS.
APPLICATION FILED APR. 9, 1907.
2 SHEETS—SHEET 1.
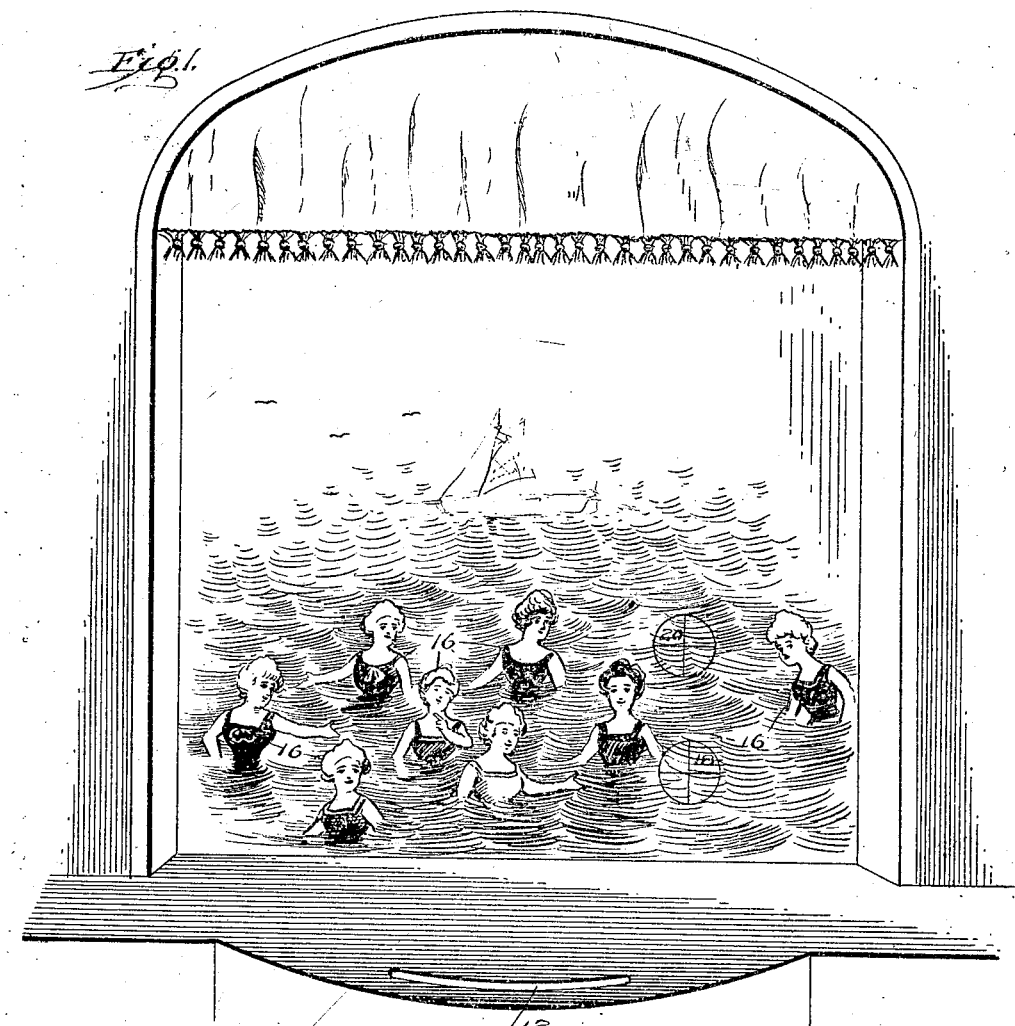
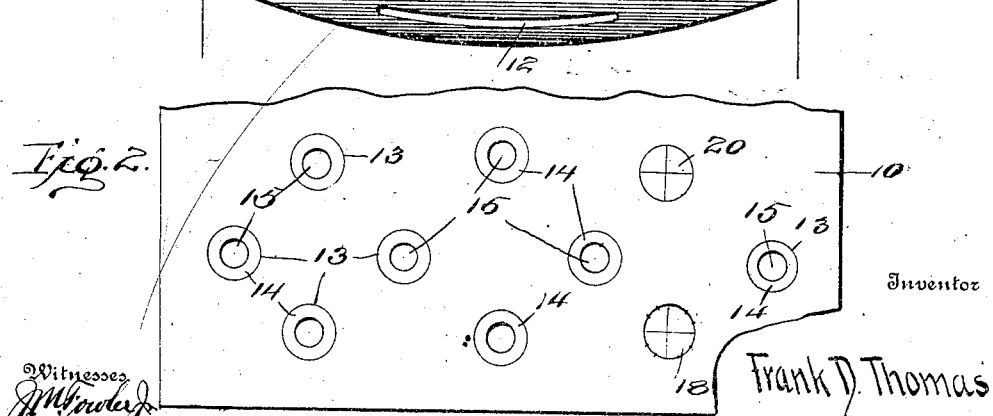

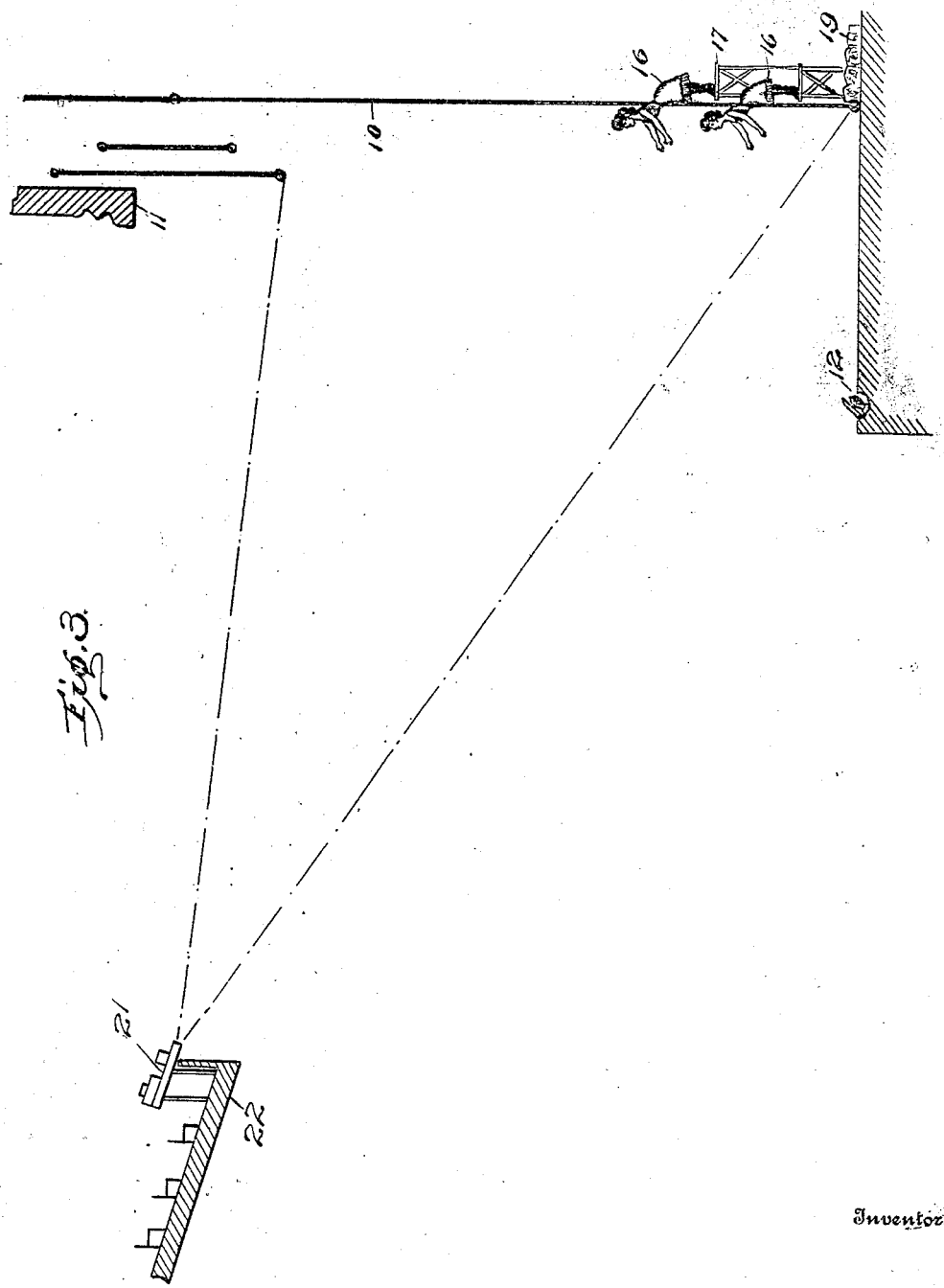

UNITED STATES PATENT OFFICE.

FRANK D. THOMAS, OF NEW YORK, N. Y.

ILLUSION APPARATUS.

No. 863,470.

Specification of Letters Patent.

Patented Aug. 13, 1907.

Application filed April 9, 1907. Serial No. 367,195.

*To all whom it may concern:*

Be it known that I, FRANK D. THOMAS, a citizen of the United States, residing at New York, in the county of New York and State of New York, have invented certain new and useful Improvements in Illusion Apparatus; and I do hereby declare the following to be a full, clear, and exact description of the invention, such as will enable others skilled in the art to which it appertains to make and use the same.

This invention relates to illusion apparatus for stages and the like, and has for an object to provide means combining a moving scene with moving figures independent of but forming a part of the scene.

A further object of the invention is to provide in an illusion apparatus means for throwing a moving picture upon a screen, which said moving picture forms a scenery, and moving objects projected through the screen and moving in unison with and forming a part of the scene represented by the moving picture.

A further object of the invention is to provide in an illusion apparatus a moving picture preferably of a water scene showing waves, breakers and the like, and with objects, preferably human beings, with their bodies projected partly through the screen, upon which the moving picture is projected and moving to represent bathers in the water represented by the moving picture.

A further object of the invention is to provide means for carrying out the illusion of bathers among the waves and breakers.

With these and other objects in view, the invention comprises certain novel constructions, combinations and arrangements of parts, as will be hereinafter fully described and claimed.

In the drawings:—Figure 1 is a view in front elevation of a proscenium arch and curtain therefor with a conventional representation of a bathing scene thrown thereupon, it being understood that the scene representing the water is produced by a moving picture machine and the bathers being human beings. Fig. 2 is a fragmentary view of a curtain adapted to permit a part of the human body to be inserted therethrough, and to receive the projections from a moving picture machine thereupon. Fig. 3 is a conventional view showing a screen in section and with the persons forming a part of the bathing scene seen partly through the screen.

Like characters of reference indicate corresponding parts throughout the several views.

In carrying out the illusion which forms the subject-matter of this application a screen, as 10, is provided suspended in any approved manner, preferably back of the proscenium arch 11, and with the foot lights 12 of the usual and ordinary stage.

The screen is provided with any approved number of openings 13 formed therein within which is secured an elastic material, as 14, preferably of white sheet rubber, and with an opening 15 concentric with the opening 13.

By the employment of the elastic material 14 within the opening 13 the upper or any part of a human body may be easily and conveniently inserted through the opening 13, and the elastic material will close tightly about the form at any desired point so that the persons 16 seated or standing upon any approved form of support or trestle, as 17, show only so much of their body as is inserted in front of the screen 10.

At any convenient point in the screen a vampire door 18 is provided of a material corresponding in color to the color of the screen and through which a person may dive in representation of diving into the water.

Behind the screen 10 adjacent the vampire door 18 is disposed a mattress or other means 19 upon which a person diving through the vampire door 18 may land without injury and another or other vampire door or doors, here shown as 20, is provided through which the person diving through the vampire door 18 may insert a part of his body to represent diving under the water in one place and coming up in another place. To produce the water scene a moving picture machine shown conventionally at 21, is mounted at any convenient place as upon the usual and ordinary balcony or gallery 22, and so focused and manipulated as to throw a scene representing waves or breakers to fill the entire screen, which, in turn, fills the intervals of the proscenium arch.

While, as above described, the preferred scene cast upon the screen is a water scene representing waves and breakers as the most readily adaptable for use in connection with the human figures employed, it is to be understood that the invention is not limited to the employment of a water scene, but any other scene may be employed in which moving physical figures may be adapted to form a part.

While, as above described, human figures have been employed in representation with the moving picture scene, it is to be understood that any moving object, either animate or inanimate, may be similarly employed without departing from the spirit of the invention.

The vampire door referred to in the foregoing description may be constructed in any of several well known forms and is a well known adjunct and appliance to stage scenery. It is constructed by producing an opening of any desired shape through the scenery and mounting therein a plurality of doors whose combined area corresponds exactly with the opening and which doors are provided with the same scenery as appears upon the surrounding surface. The doors are hinged in such manner that they open from the middle outwardly and are closed by quick acting springs so that when a person passes through the doors the doors close almost instantaneously to return to position the scenery. The vampire door 18 would preferably be formed with a circular opening with the door formed in four segments as shown particularly in Figs. 1 and 2 with hinges upon each section so that the doors will open upon the circumferential line and with hinges applied thereto so that the door will close almost instantly upon a person jumping or diving through such opening. The door 20 may differ in form, as after the operator has inserted his head and shoulders through such openings it will not be necessary for it to close again and for such purpose the door may be somewhat similar to the other openings produced in the canvas 10, as, for instance, by simply closing the opening with elastic material in any approved manner, so that the elastic material corresponding in color to the screen will permit the actor to insert his head and shoulders through such opening as though coming out of the water.

What I claim is:—

1. In an illusion apparatus, a screen, means to throw a moving picture upon the screen representing a scene, and means to permit the entrance of animate bodies through the screen to form a part of the scene in association with the moving picture.

2. In an illusion apparatus, a screen, means to cast upon the screen a moving picture representing waves, and means adapted to permit the entrance of human bodies through the screen in position to produce the effect of being among the waves.

3. In an illusion apparatus, a screen, means to throw a moving picture upon the screen, means adapted to permit the entrance of animate bodies through the screen, and means to permit a body to pass through the screen from the front in one direction and to appear from the back in another direction.

4. In an illusion apparatus, a screen provided with a plurality of openings embodying an elastic diaphragm, means to position human bodies adjacent to the openings and means adapted to throw a scene upon the screen.

5. In an illusion apparatus, a screen provided with an opening and with an elastic fabric secured within the opening and provided with an opening, means to position a body adjacent to the opening and means adapted to throw a scene upon the screen.

6. In an illusion apparatus, a screen provided with an opening embodying an elastic diaphragm, means to position a body adjacent to the opening, a vampire door opening from front to rear, a vampire door opening from rear to front and means adapted to throw a scene upon the screen.

In testimony whereof I affix my signature in presence of two witnesses.

FRANK D. THOMAS.

Witnesses:
H. L. ROTH,
EDWARD S. SCHWARTZ.